April 16, 1963 D. M. SCHWARTZ ETAL 3,085,643
ENDLESS TREAD VEHICLE HAVING A PUMP MOUNTED THEREON
Filed June 15, 1959 20 Sheets-Sheet 14
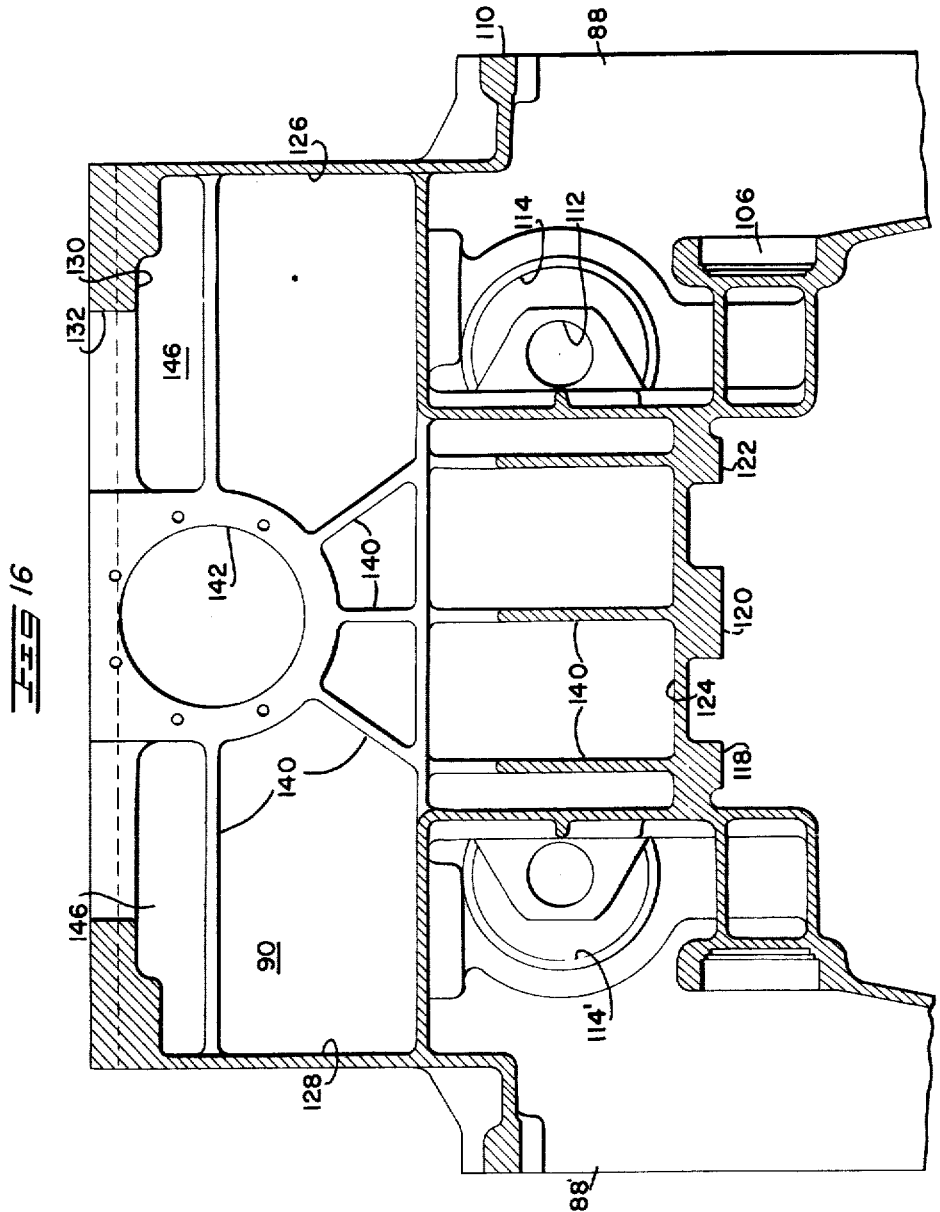
INVENTORS
DANIEL M. SCHWARTZ
THEODORE N. HACKETT
JOSEPH ROSENBLATT
BY
ATTORNEY

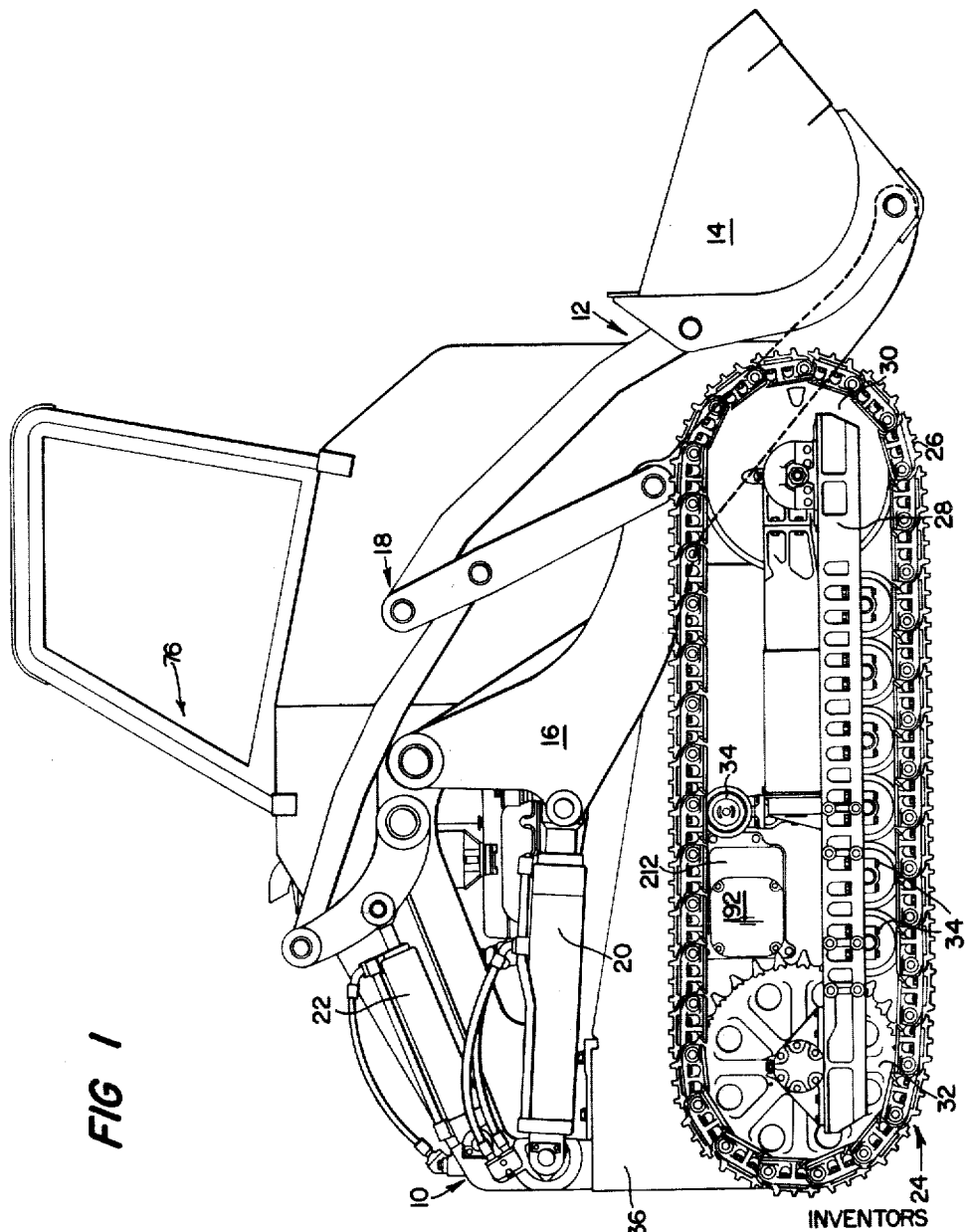

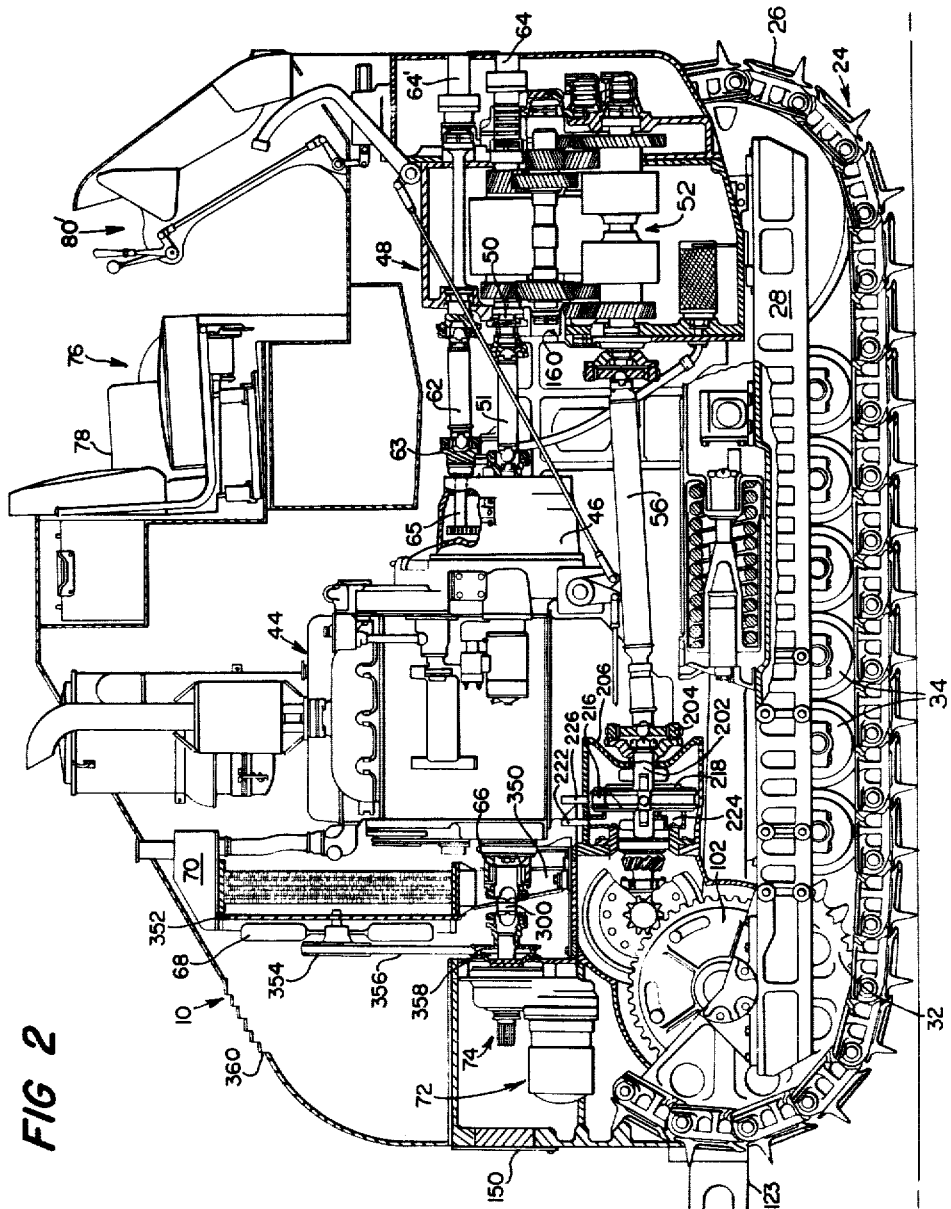

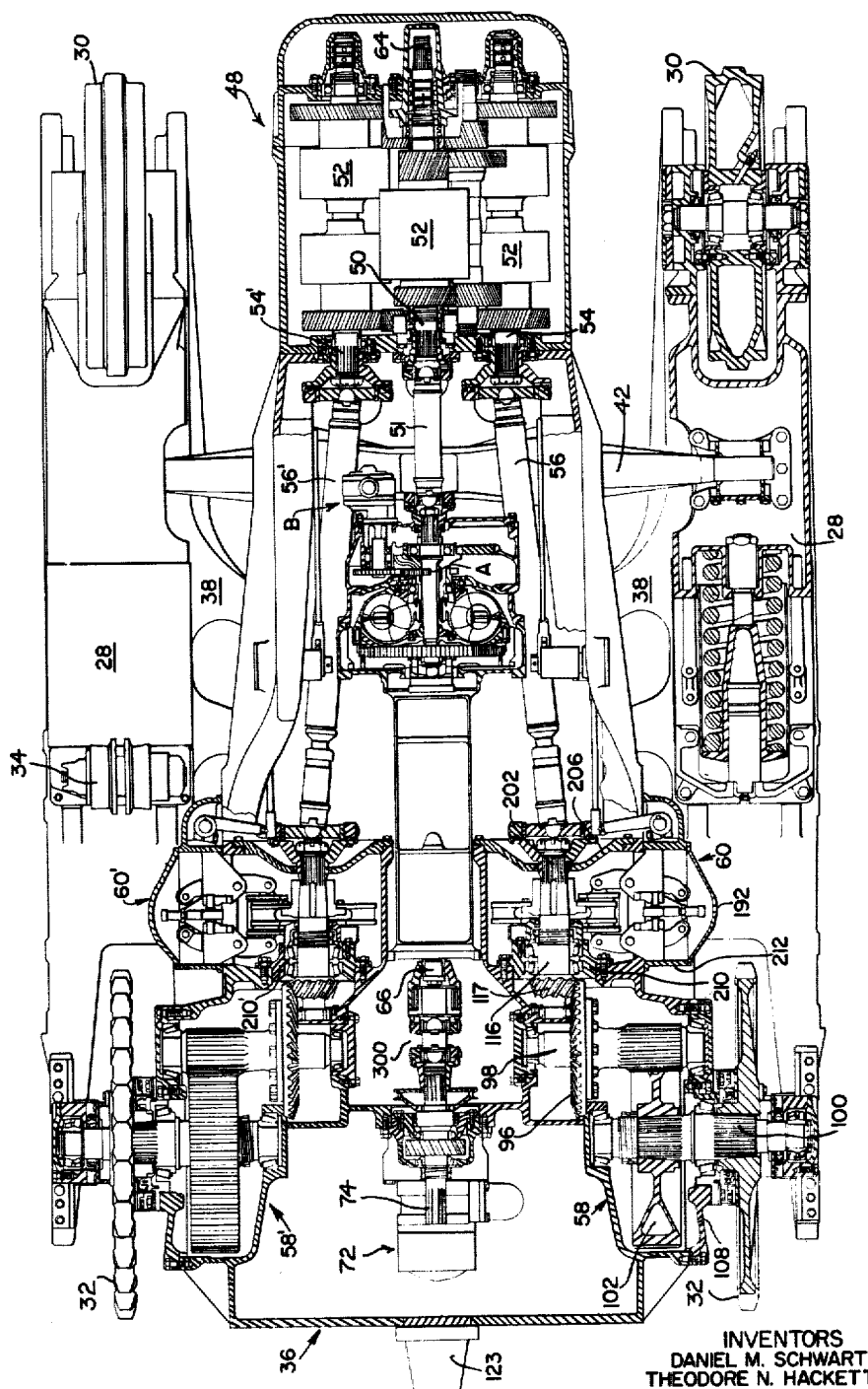

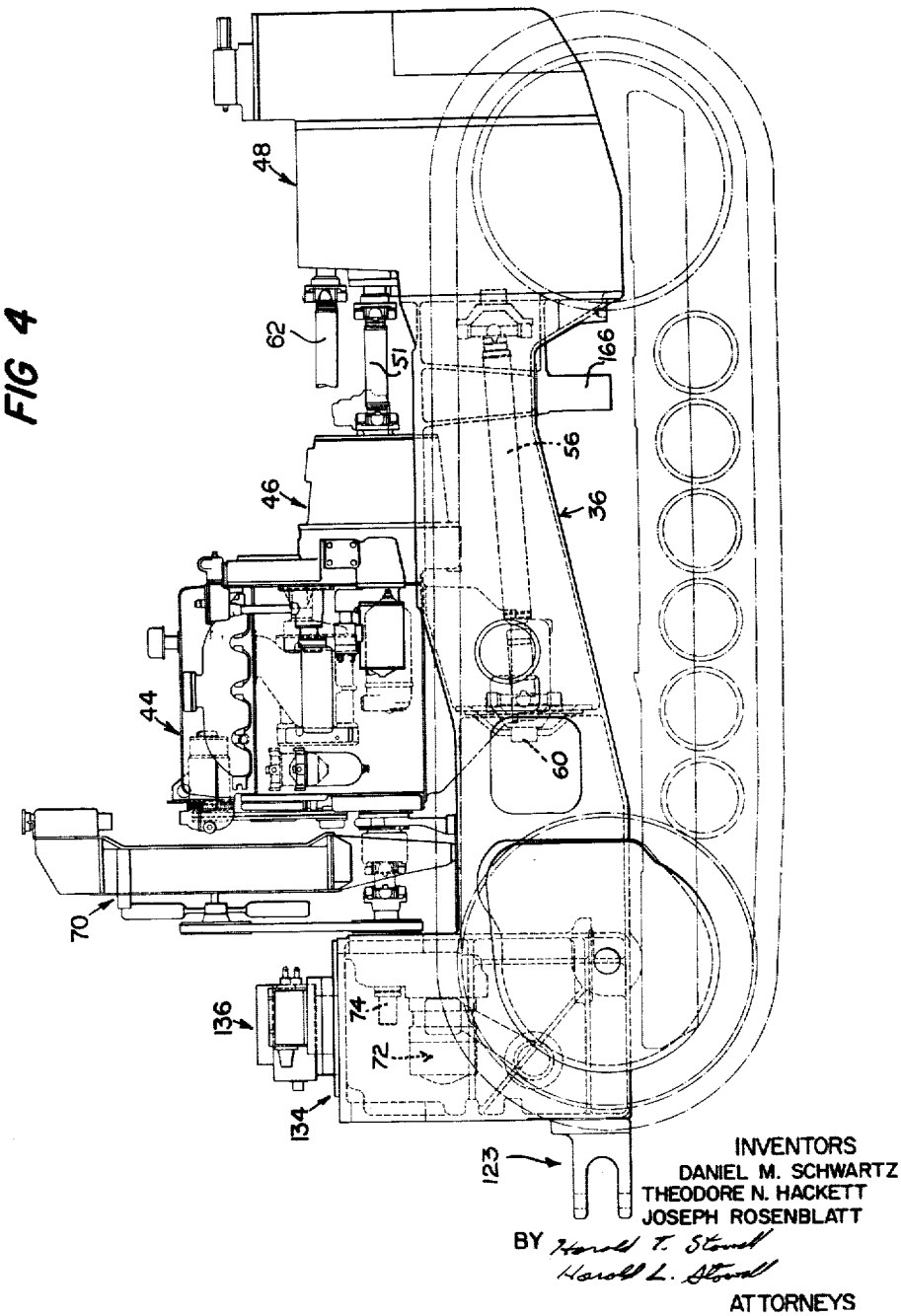

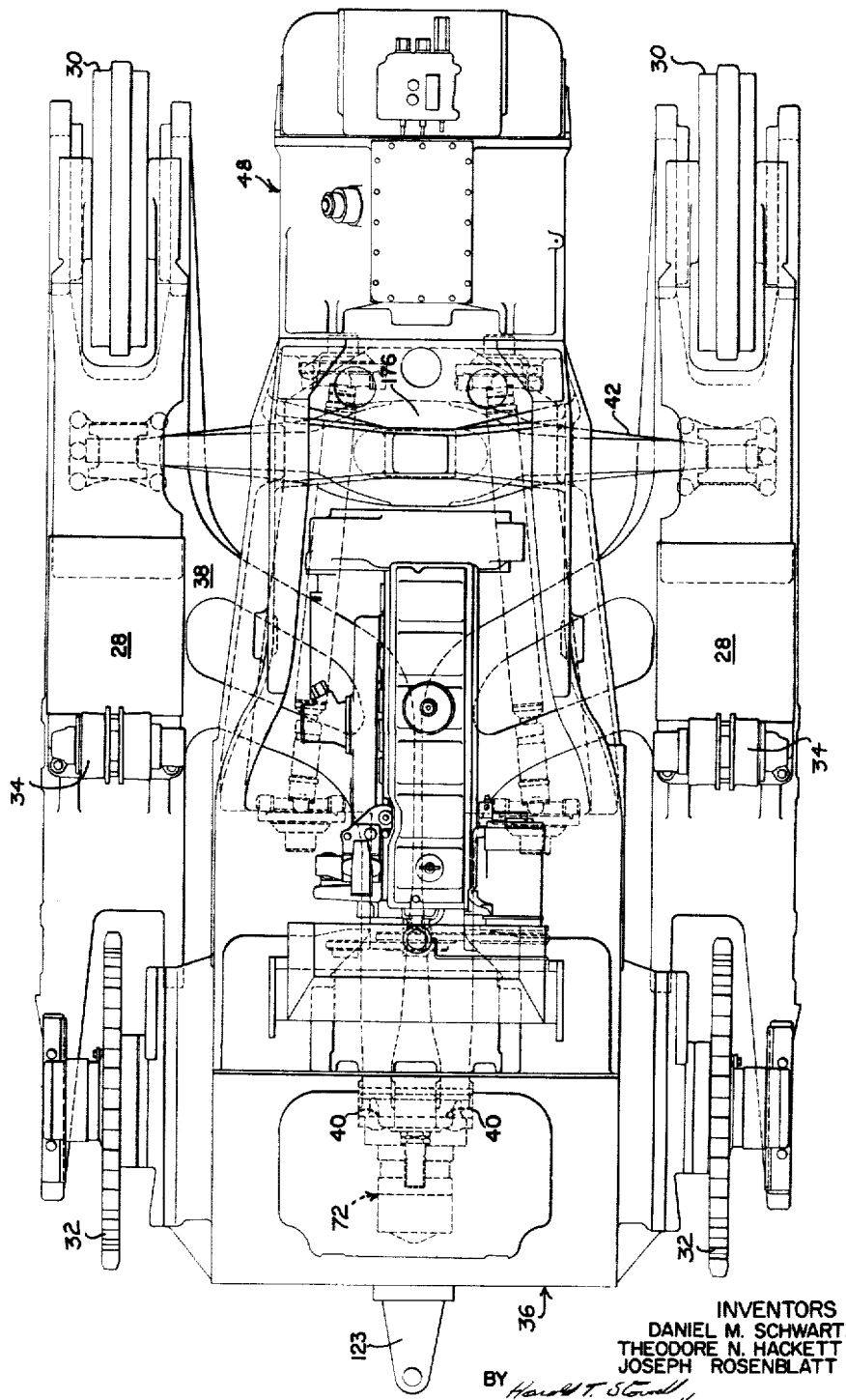

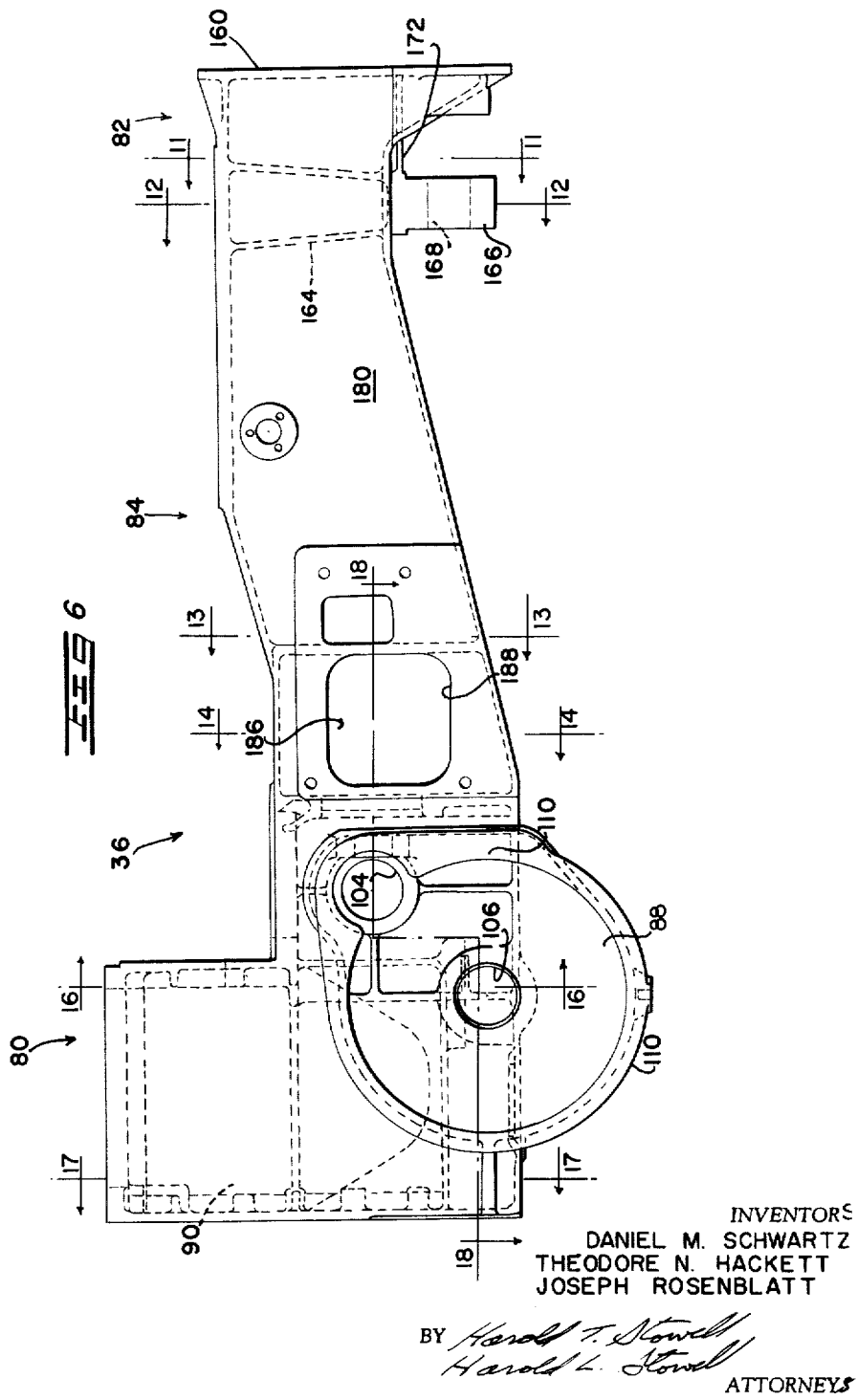

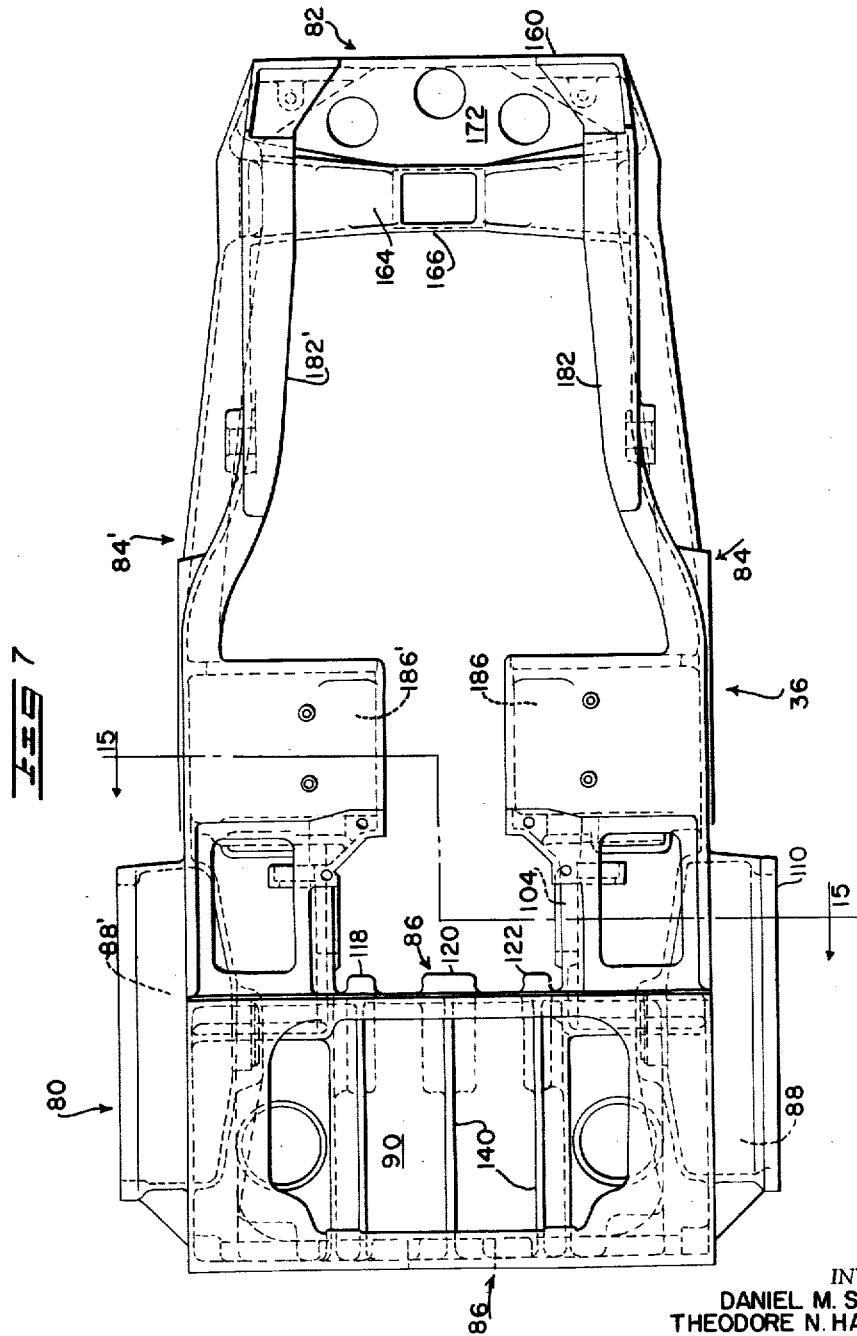

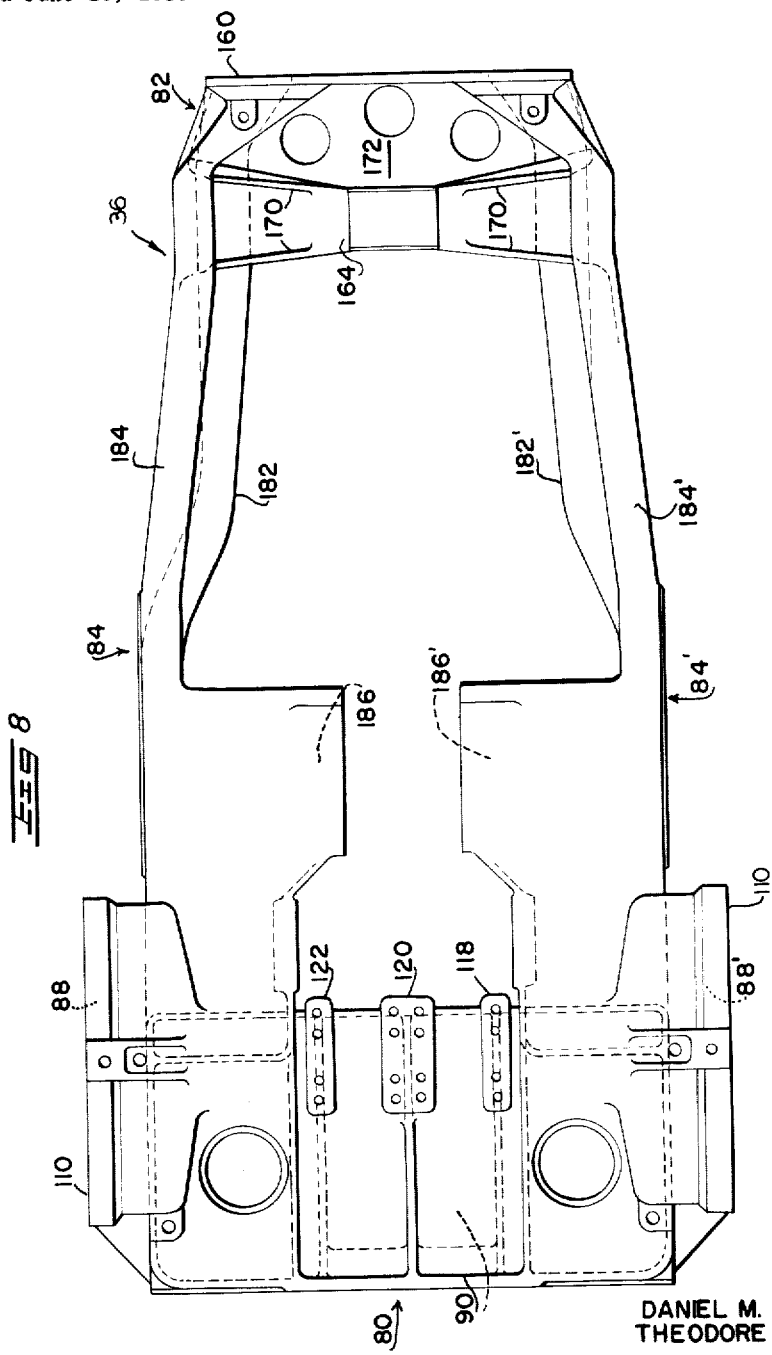

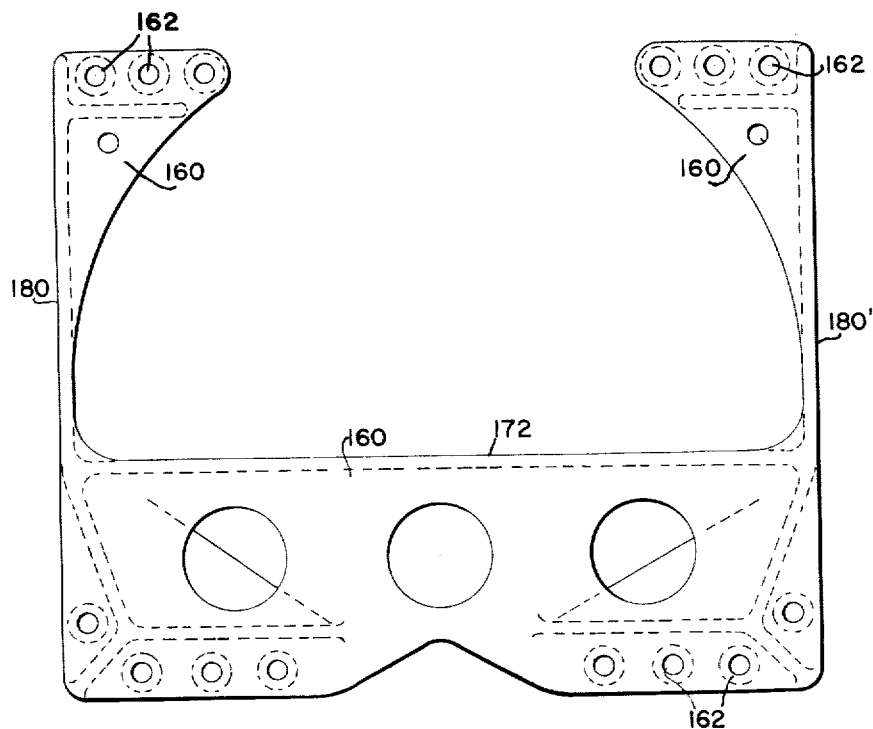

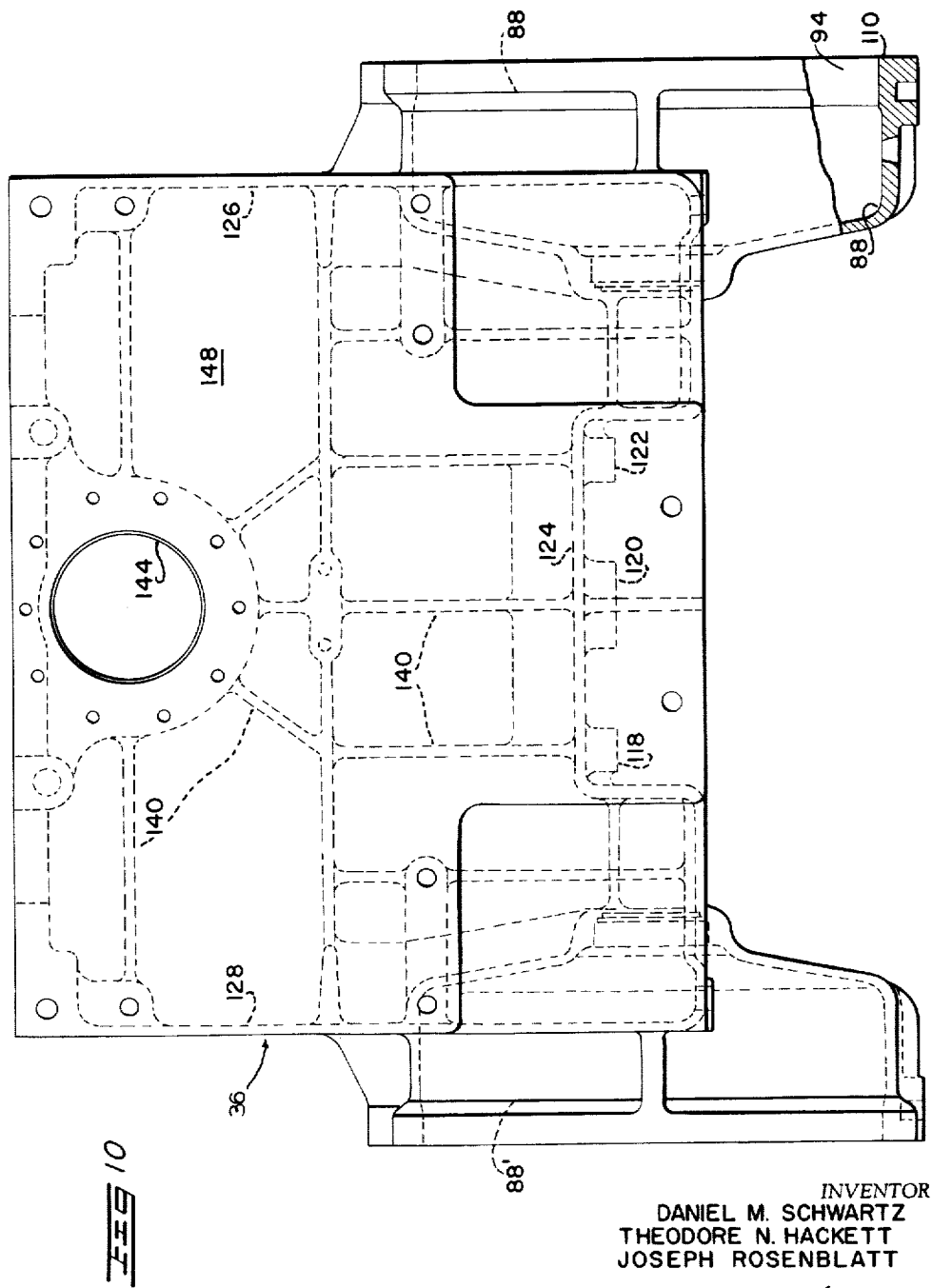

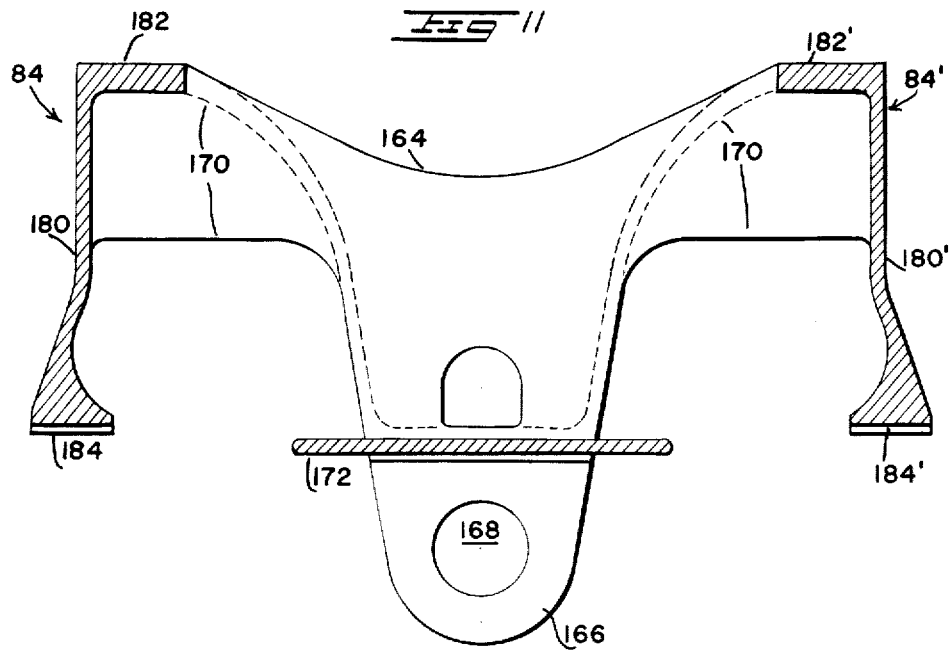
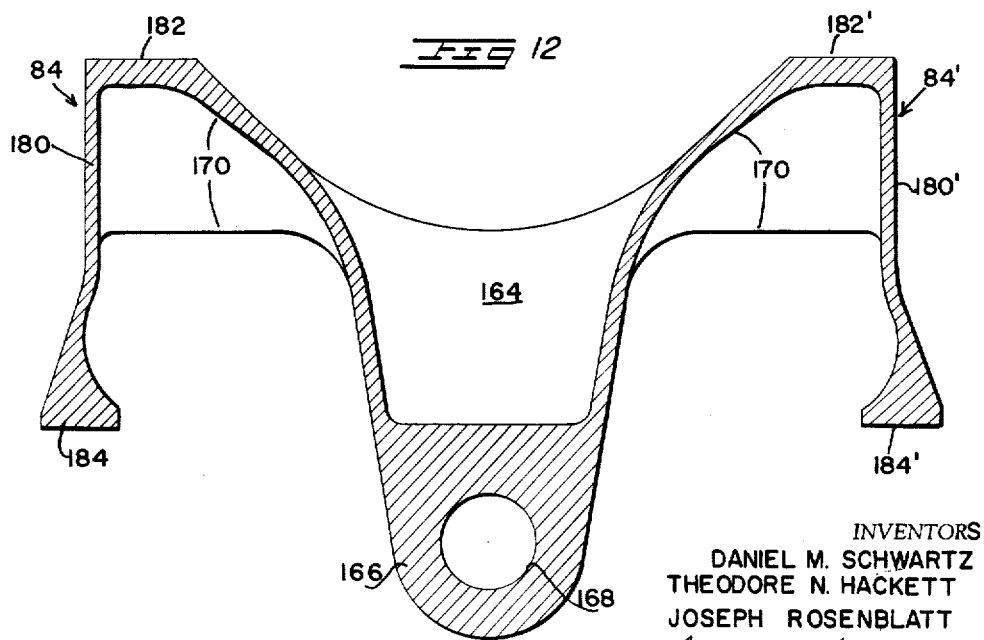

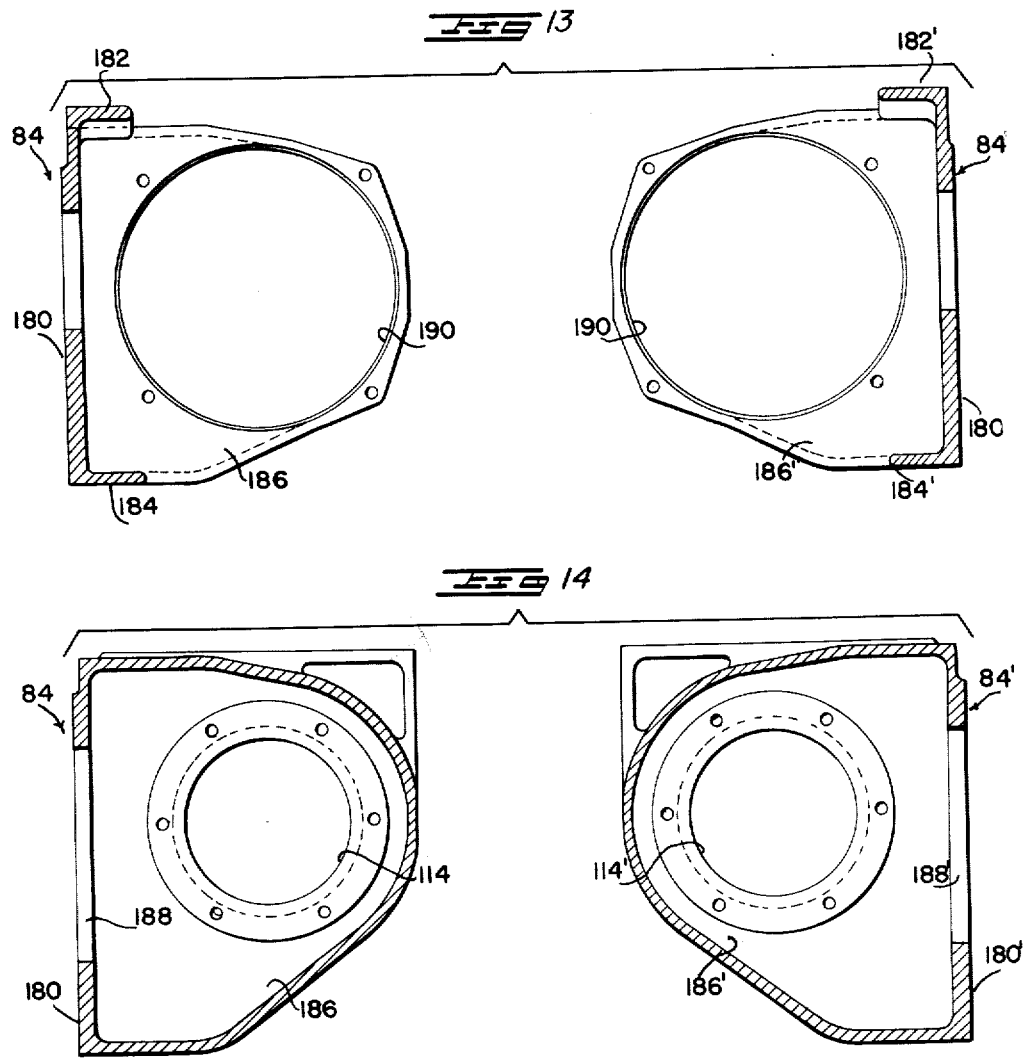

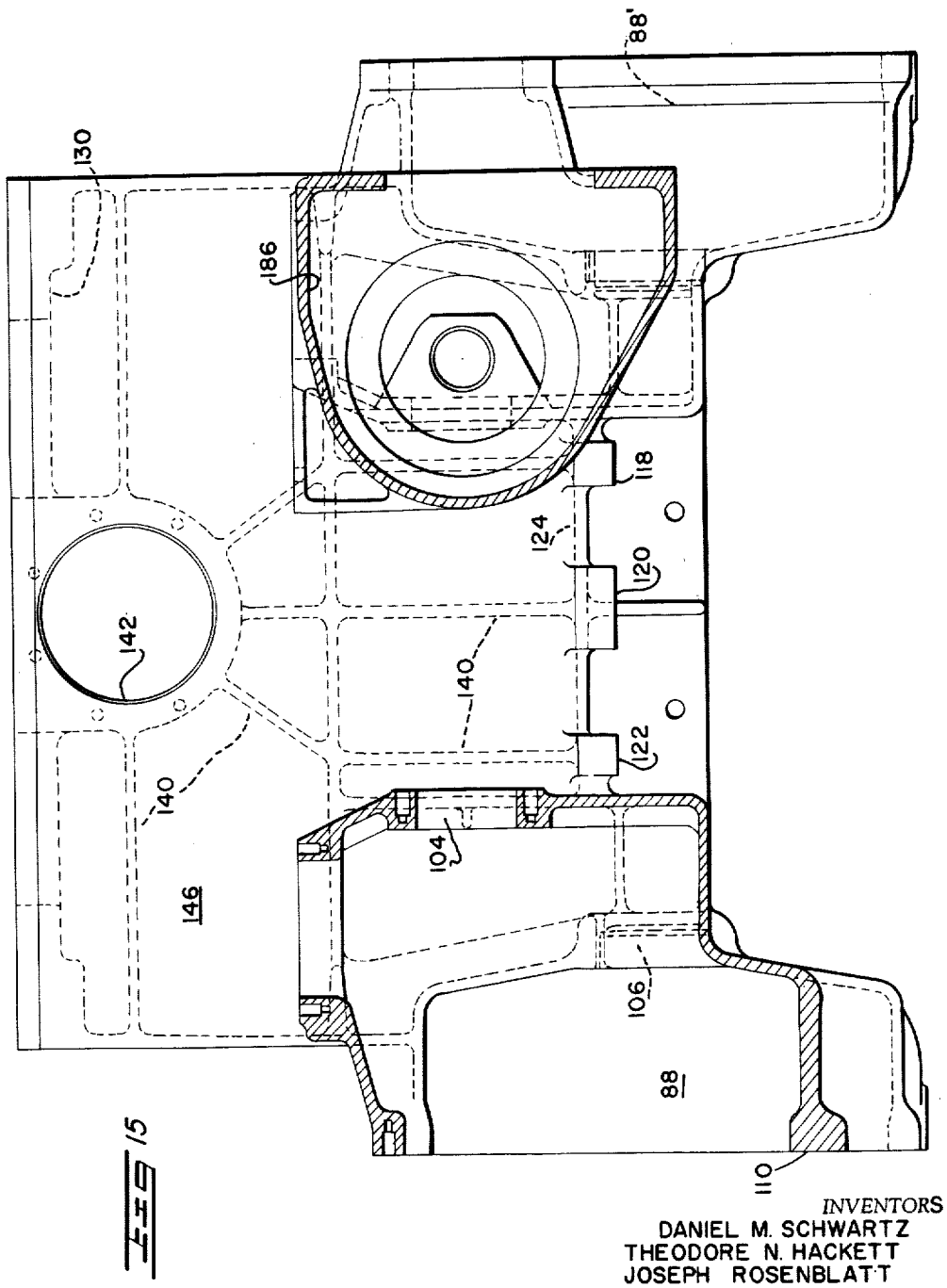

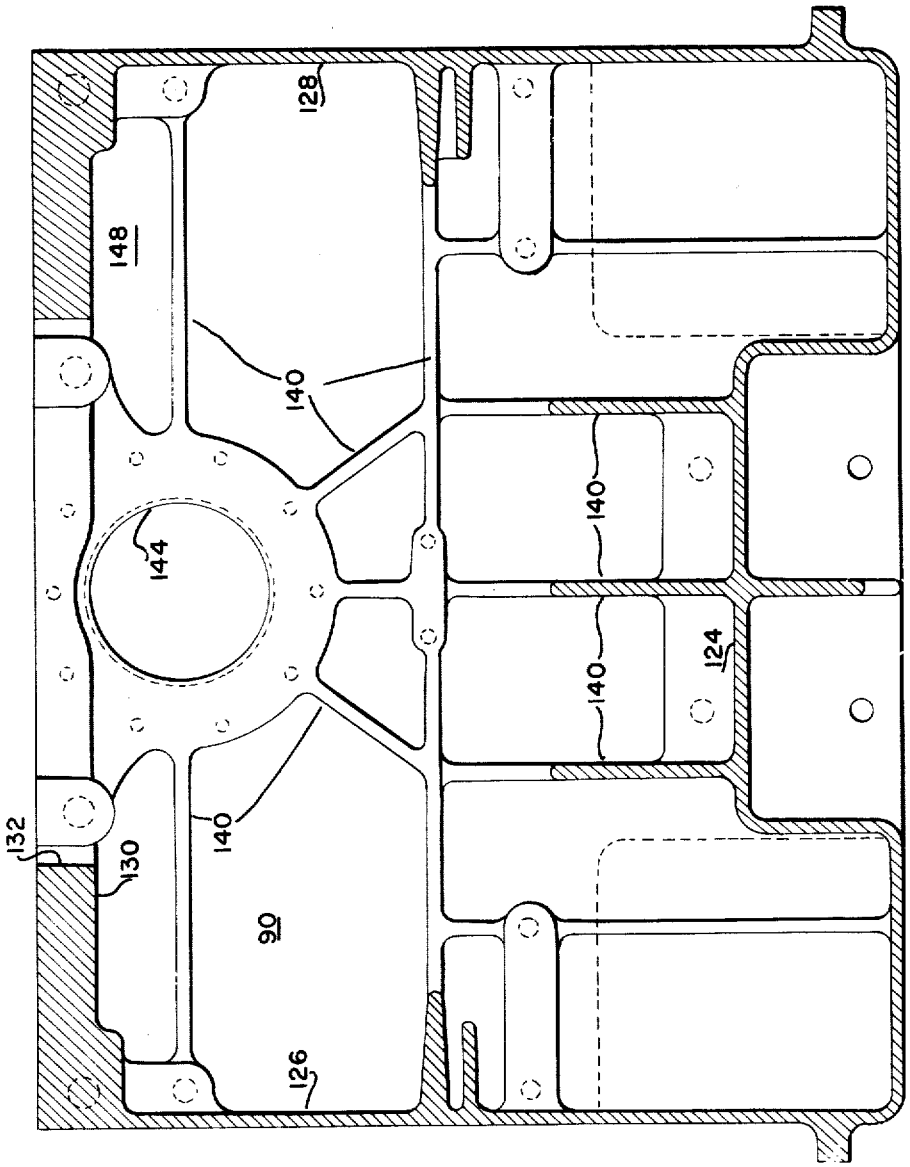

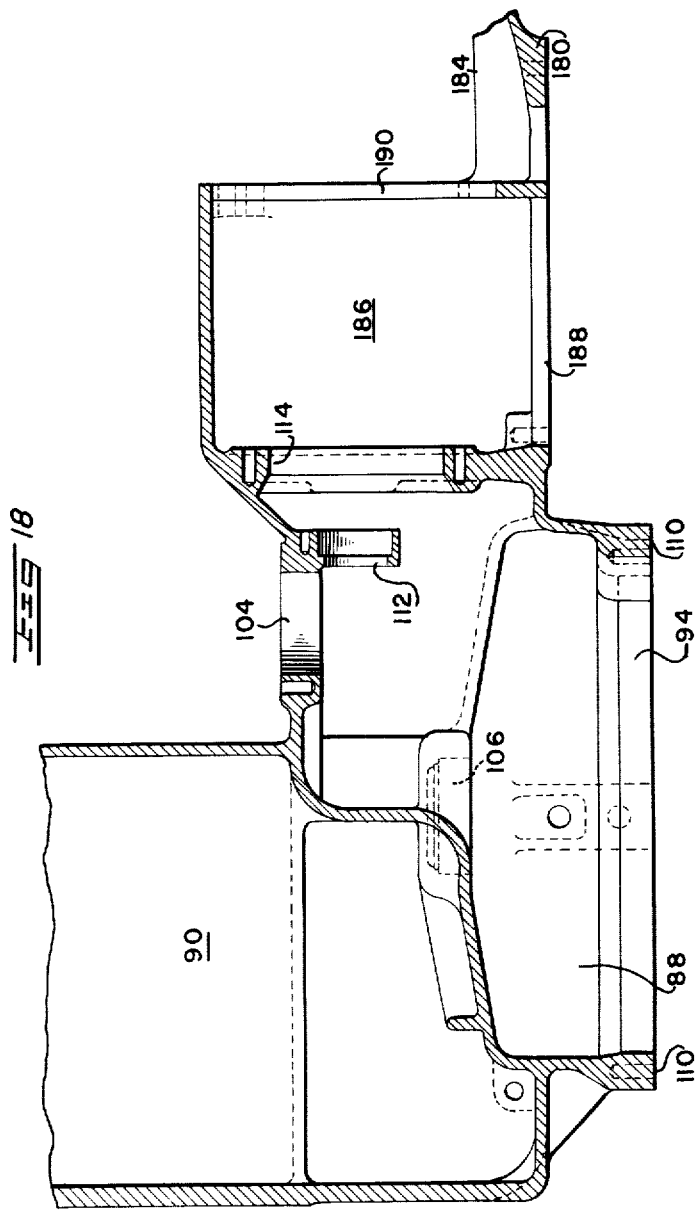

April 16, 1963 D. M. SCHWARTZ ETAL 3,085,643
ENDLESS TREAD VEHICLE HAVING A PUMP MOUNTED THEREON
Filed June 15, 1959 20 Sheets-Sheet 17

INVENTOR
DANIEL M. SCHWARTZ
THEODORE N. HACKETT
JOSEPH ROSENBLATT
BY Harold T. Stowell
Harold L. Stowell
ATTORNEYS April 16, 1963    D. M. SCHWARTZ ETAL    3,085,643
ENDLESS TREAD VEHICLE HAVING A PUMP MOUNTED THEREON
Filed June 15, 1959    20 Sheets-Sheet 19

INVENTORS
DANIEL M. SCHWARTZ
THEODORE N. HACKETT
JOSEPH ROSENBLATT

BY *Harold T. Stowell*
*Harold L. Stowell*

ATTORNEY

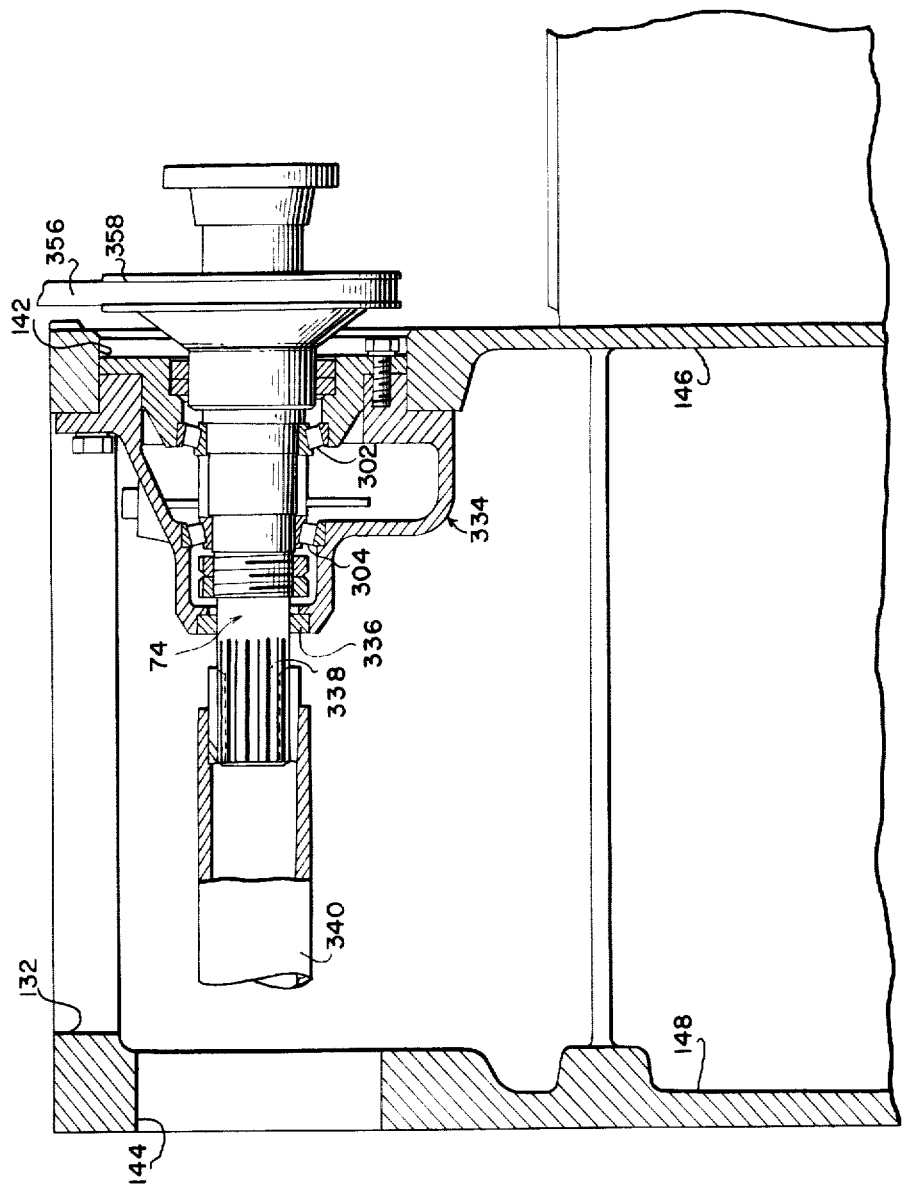

United States Patent Office 3,085,643
Patented Apr. 16, 1963

3,085,643
ENDLESS TREAD VEHICLE HAVING A PUMP MOUNTED THEREON
Daniel M. Schwartz, Theodore N. Hackett, and Joseph Rosenblatt, Salt Lake City, Utah, assignors to The Eimco Corporation, Salt Lake City, Utah, a corporation of Delaware
Filed June 15, 1959, Ser. No. 820,385
4 Claims. (Cl. 180—53)

This invention relates to improvements in land vehicles and, in particular, to crawler mounted vehicles which may mount scraping blades, front end loading bucket structures, overhead loader bucket structures, log-loading attachments or the like.

It is a primary object of the present invention to provide such a land vehicle having a unitary cast main frame.

A further object is to provide such a vehicle wherein the cast main frame includes, as unitary portions thereof, a hydraulic reservoir, and cavities for the reception of brake mechanism and for the final drive components of the ground-engaging propelling means.

A further object is to provide such a vehicle including hydraulic pump means and pump drive gearing mounted within the hydraulic reservoir below the normal level of the hydraulic fluid therein.

A further object is to provide a land vehicle having a main frame portion carrying a centrally mounted prime mover and an operator's station positioned forwardly of the prime mover.

A further object is to provide such a vehicle wherein the cooling system for the prime mover includes a radiator, and fan means for drawing air away from the operator's station, across the prime mover, through the radiator and then to the blades of the fan, thereby materially increasing the life of the radiator by reducing the abrasive action of cooling air carried abrasive particles, and improving the working conditions of the operator.

Another object is to provide a land vehicle having a unitary cast main frame that has minimum weight with maximum strength and rigidity.

A further object is to provide a land vehicle having a unitary cast main frame wherein the distribution of metal to obtain strength where needed and reduce weight where high strength is not required is readily accomplished.

These and other objects and advantages are provided in a land vehicle having a unitary cast main frame including a rear transverse member, a front transverse member and spaced generally parallel lateral webs integrally joining the rear transverse member and the front transverse member, the rear transverse member having opposed spaced cavities formed therein for the reception of the vehicle final drive components, and a well adapted to receive hydraulic fluid formed between the opposed spaced final drive receiving cavities, a pump submerged in the well below the normal level of the hydraulic fluid, the front transverse member including a depending boss cooperating with tie means for joining the front transverse member of the main frame with ground-engaging vehicle propelling means, a prime mover supported by the parallel lateral webs and having a forwardly extending power shaft and a rearwardly extending power shaft, a transmission having a single input shaft and dual output shafts mounted to the front transverse member and projecting forwardly thereof, means connecting the forward power shaft of the prime mover to the input shaft of the transmission, means connecting the rear power shaft of the prime mover to the pump in the well of the main frame, a fan driven by the rear power shaft of the prime mover, and a radiator interposed between the prime mover and the fan, the pitch of the blades of the fan and the direction of rotation thereof being so selected that air is drawn across the prime mover through the radiator and to the blades of the fan.

Further objects and advantages will appear from the following description and appended claims when read in conjunction with the attached drawings wherein:

FIG. 1 is a side elevation of a material handling machine, incorporating the features of the present invention, having crawler track-type propelling means and a front end loading bucket structure;

FIG. 2 is a partially cut-away and sectioned view in elevation showing the interior arrangements of the various tractor components of a land vehicle incorporating the teachings of the invention;

FIG. 3 is a partially cut-away and detailed plan view of the vehicle shown in FIG. 2;

FIG. 4 is a fragmentary partially cut-away side elevation view of the vehicle shown in FIG. 2;

FIG. 5 is a fragmentary and partially cut-away bottom plan view of the vehicle illustrated in FIG. 2;

FIG. 6 is a side elevation view of the integrally cast main frame of the invention;

FIG. 7 is a top plan view of the main frame shown in FIG. 6;

FIG. 8 is a bottom plan view of the main frame shown in FIG. 6;

FIG. 9 is a front elevation view of the main frame transmission mounting face;

FIG. 10 is a rear elevation view of the main frame shown in FIG. 6;

FIG. 11 is a transverse section substantially on line 11—11 of FIG. 6;

FIG. 12 is a transverse section substantially on line 12—12 of FIG. 6;

FIG. 13 is a transverse section substantially on line 13—13 of FIG. 6;

FIG. 14 is a transverse section through the main frame substantially on line 14—14 of FIG. 6;

FIG. 15 is a section substantially on line 15—15 of FIG. 7;

FIG. 16 is a transverse section through the rear portion of the main frame substantially on line 16—16 of FIG. 6;

FIG. 17 is a transverse section through the rear portion of the main frame substantially on line 17—17 of FIG. 6;

FIG. 18 is a fragmentary section substantially on line 18—18 of FIG. 6 showing a portion of the hydraulic reservoir, a final drive cavity and one of the integral brake receiving cavities;

FIG. 22 is a partially cut-away and sectioned view of a rear power takeoff drive shaft arrangement assembled in the hydraulic reservoir for use on land vehicles where the hydraulic pump drive is not employed.

*The Land Vehicle*

Figure 19:
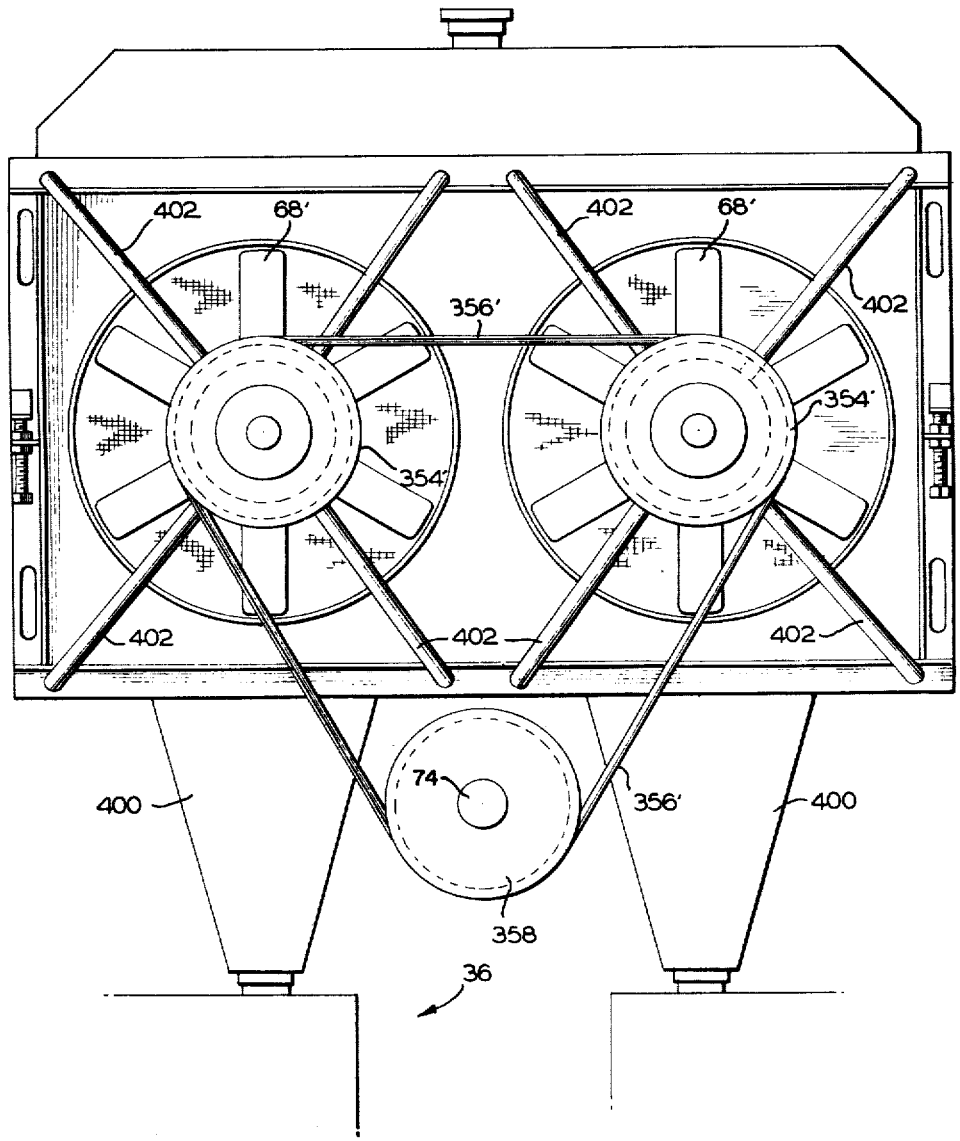
FIG. 19 is an enlarged fragmentary detailed view of a modified radiator and dual fan arrangement.

Referring to FIGS. 1 through 5, a land vehicle 10 is illustrated and includes in FIG. 1 as the material handling superstructure a front end loading bucket mechanism 12. The front end loading bucket mechanism 12 includes a bucket 14 supported by arm means 16 and bucket tilting linkage generally designated 18. The bucket lifting and lowering mechanism includes hydraulic cylinders 20 connected to a unique hydraulic fluid supply system to be more fully disclosed hereinafter. The bucket tilting linkage 18 is actuated by hydraulic cylinders 22, also interconnected to the improved hydraulic system.

The land vehicle 10 is propelled by paired endless track means 24 which means include endless crawler tracks 26, track frames 28, front idler pulleys 30, rear drive sprockets 32 and intermediate idler wheels 34.

The land vehicle has a main frame generally designated 36 which main frame is connected to the paired crawler frames 28 by diagonal braces 38 which are pin-connected adjacent the rear of the main frame as at 40. The forward ends of each of the crawler frames 28 are connected to the main frame 36 through an equalizer bar assembly generally designated 42 as to be more fully described hereinafter.

The main frame supports a prime mover 44 having a conventional torque converter 46 mounted at the forward end thereof, and a change-speed and reverse transmission 48 which transmission projects forwardly from the front portion of the main frame. The transmission 48 includes an input shaft 50, driven by power shaft 51 from torque converter 46, change-speed and reverse gearing generally designated 52, a pair of rearwardly extending parallel output shafts 54 and 54' and a front power takeoff shaft 64. Each of the output shafts 54 and 54' is coupled to a torque shaft 56 and 56' respectively. The torque shafts 56 and 56' extend through the forward portion of the main frame 36 and connect to final drive structures 58 and 58' received in final drive cavities in the rearward portion of the main frame. The connection between the torque shafts 56 and 56' and their respective final drives 58 and 58' includes brake assemblies generally designated 60 and 60'.

A further forwardly extending power takeoff shaft 62 is illustrated in FIG. 2 which shaft is connected to a power takeoff coupling 64' positioned adjacent the front end of the transmission 48. The shaft 62 is coupled as at 63 to a shaft 65 which is journaled within the torque converter housing. The shaft 65 is gear connected to the motor output shaft whereby the vehicle is provided with two forward power takeoff shafts, one driven by the torque converter and the other bypassing the torque converter.

The prime mover 44 also includes a rearwardly extending power output shaft 66 which, as to be more fully described, drives a fan 68 for circulating air through the radiator 70 for cooling the prime mover. The rearwardly extending power output shaft 66 also drives pump means 72 providing pressure fluid for actuating the front end loading structure where such front end loading structure is carried by the land vehicle and also provides a rear power takeoff shaft 74 as more clearly illustrated in FIG. 2 of the drawings.

The land vehicle 10 has an operator's compartment 76 having a seat 78 and controls 80' therein. With the operator positioned at the upper forward end of the vehicle, his view during operation of the vehicle is unobstructed.

While the illustrated form of the land vehicle is shown supporting a front end loading bucket mechanism 12, the vehicle may comprise a tractor, or may mount dozer blades, overhead rocker bucket type loading structures, log handling equipment, or the like, without departing from the scope of the present invention. It will be further appreciated that the vehicle may be propelled along the ground by conventional wheel means replacing the endless crawler track mechanisms shown in the drawings.

*The Main Frame*

Referring specifically to FIGS. 6 through 18, the main frame generally designated 36 comprises a unitary casting including a rear portion 80, a front portion 82 and spaced generally parallel lateral members 84 and 84' integrally joining the rear portion 80 and the front portion 82.

The rear portion 80 comprises a transverse member 86 which transverse member includes laterally spaced cavities 88 and 88' for the reception of the vehicle final drive components 58 and 58' and a well 90 which extends generally between the laterally spaced final drive receiving cavities 88 and 88'. The well is adapted to receive hydraulic fluid and pump means, as to be more fully described hereinafter, when the vehicle is employed with attachments including hydraulically actuated mechanisms such as the front end loader attachment illustrated in FIG. 1.

Each of the final drive cavities 88 and 88' is identical in form and includes a large opening 94 through which bevel gear and shaft 96 and 98, and output drive shaft 100 having splined thereto output drive gear 102 are inserted in the casting cavity. An opening 104 is provided to receive the inboard bearing means of bevel gear shaft 98 and an opening 106 adapted to receive the inboard bearing means for the final output shaft 100. The outboard bearings for the bevel gear shaft 98 and final output drive shaft 100 are carried by a large cover plate 108 which is secured to face 110 of each of the final drive cavities 88 and 88' of the rear portion of the main frame. A further pair of openings 112 and 114 support bearings for a pinion shaft 116 carrying pinion gear 117 for each of the final drives. It will be particularly noted with reference to, for example, FIGS. 10, 15, 16 and 18 that the final drive receiving cavities 88 and 88' and their cooperating openings for reception of the bearing means for the final drive shafting are formed with smoothly curved surfaces to provide the best flow of metal to obtain a sound casting of minimum weight, maximum strength and rigidity and to produce a structure having minimum concentration of stresses.

The remaining portion of the rear transverse member 86 of the main frame casting 36 includes the well 90 which has plural functions. The well 90 is the spacer for the final drive receiving cavities 88 and 88'; it provides the lower mounting surfaces 118, 120 and 122 for the brackets carrying the pivot pin means 40 of the diagonal brace and crawler frame assemblies, the mounting station for the pressure fluid pump means 72, the bearing supports for a rear power takeoff and a rigid support for a rear draw bar 123.

The well 90 is defined by a bottom surface 124, side walls 126 and 128, a top wall 130 having an opening 132 therein and front and rear walls 146 and 148. The top opening 132 receives a cover plate 134 illustrated, for example, in FIG. 4 which cover plate mounts control valves and pressure fluid conduit means 136 for distributing pressure fluid from the pump 72 mounted within the well 90 as to be more fully described hereinafter. It will be particularly noted that the base 124, the sides, the front and back walls, and the top wall of the well are provided with integrally cast stiffening ribs to provide the necessary rigidity, with a minimum of weight, in the rear section. These plural ribs or webs are generally designated with the numeral 140.

The well 90 also includes an opening 142 about which the pump means 72 is mounted and an opposed opening 144 in the rear wall 148 through which connection may be had for the rearwardly extending power takeoff shaft extension 340. The opening 144 in the rear wall 148 is provided with a cover plate 150 when no rear power attachment is employed and the front opening 142 in the front wall 146 of the well 90 is normally closed by the mounting means for the transmison for the pump 72 as to be more fully described hereinafter.

The front portion 82, as specifically illustrated in FIGS. 6, 7, 8, 9, 11, and 12, has an extended flat surface or face portion 160 provided with a plurality of openings 162 therethrough. This face portion mounts the forwardly extending change-speed and reverse transmission 48 and the openings 162 receive bolts passing through cooperating openings in the end wall of the housing for the transmission 48.

The front portion 82 also includes a transverse web 164 having a depending boss 166 which is bored as at 168. The transverse web 164 is integrally joined to the generally parallel extending lateral members 84 and 84' and is maintained in a rigid position by strengthening webs 170 and a base plate 172 which interconnects the transverse web 164 and the front wall 160 of the main casting. The depending boss 166 is received in the bifurcated center portion 176 of the tie means or equalizer bar 42 which equalizer bar is also provided with bores which cooperate with bore 168 in the depending center boss 166. A pivot pin, passing through the bores in the equalizer bar 42 and the bore 168, mounts the equalizer member 42 to the forward end of the main frame casting 36 as more fully disclosed in copending application Serial No. 810,812 (now Patent No. 2,988,159) filed May 4, 1959 by Franz Weber and assigned to the assignee of the instant application.

The center portion of the integrally cast main frame including the generally parallel lateral members 84 and 84' will be described with particular reference to FIGS. 6, 7, 8, 9, 11, 12, 13 and 14. Each of the generally parallel lateral members 84 and 84', which integrally connect the rear portion 80 and the front portion 82, of the main frame includes a side web 180 and 180' respectively. The upper and lower edges of the side webs 180 and 180' are provided respectively with generally inwardly projecting stiffening web portions 182, 184 and 182' and 184'. The upper strengthening webs 182 and 182' comprise portions of the transverse web 164 and strengthening webs 170 thereof as more clearly illustrated in FIGS. 11 and 12.

The generally parallel lateral members 84 and 84' have at their most rearward ends, just forwardly of the rear portion 80, an enlarged inwardly projecting portion which define brake cavities 186 and 186' respectively. Each of the brake cavities 186 and 186' is generally provided with three openings designated 188, 190 and 114 and 188', 190' and 114' respectively. It will be noted that openings 114 and 114' are the openings between the final drive receiving cavities 88 and 88' and the brake receiving cavities 186 and 186'. As hereinbefore described, openings 114 and 114' receive the rear bearing supports for their respective pinion shaft 116. The openings 190 and 190' each receive a cover plate with a seal for the most forward end of the pinion shafts 116 and the openings 188 and 188' receive brake support and cover plate means as to be more fully described hereinafter.

Brake Assembly Housing

The brakes 60 and 60' for the torque shafts 56 and 56' are received in the brake cavities 186 and 186' of the main frame casting. Each of the brake assemblies 60 and 60' is identical in form and the structures thereof form no part of the present invention. The forward end 202 of each of the pinion shafts 116 is coupled through universal couplings 204 to the most rearward end of its torque shaft 56 and 56'. A plate 206, having an opening therein for its shaft 56 or 56', closes the opening 190 at the forward end of each of the brake cavities 186 and 186'. The most rearward openings 114 and 114' of the brake cavities 186 and 186' are closed by plate means 210 and 210' which also support the bearings for the pinion shafts 116. The side openings 188 and 188' into the brake cavities are closed by brake support or mounting members 212 which receive cover plates 192 and 192'. With this form of construction the brakes are effectively sealed from foreign matter. However, in order to insure proper cooling of the brakes, vane means 216 are provided on each brake disc 218 which vane means draw air in through inlet pipes 222 to annulus 224 and about the brake discs, then out outlet conduit means 226 as illustrated in FIG. 2 of the drawings.

The Pump Drive

Figure 20:
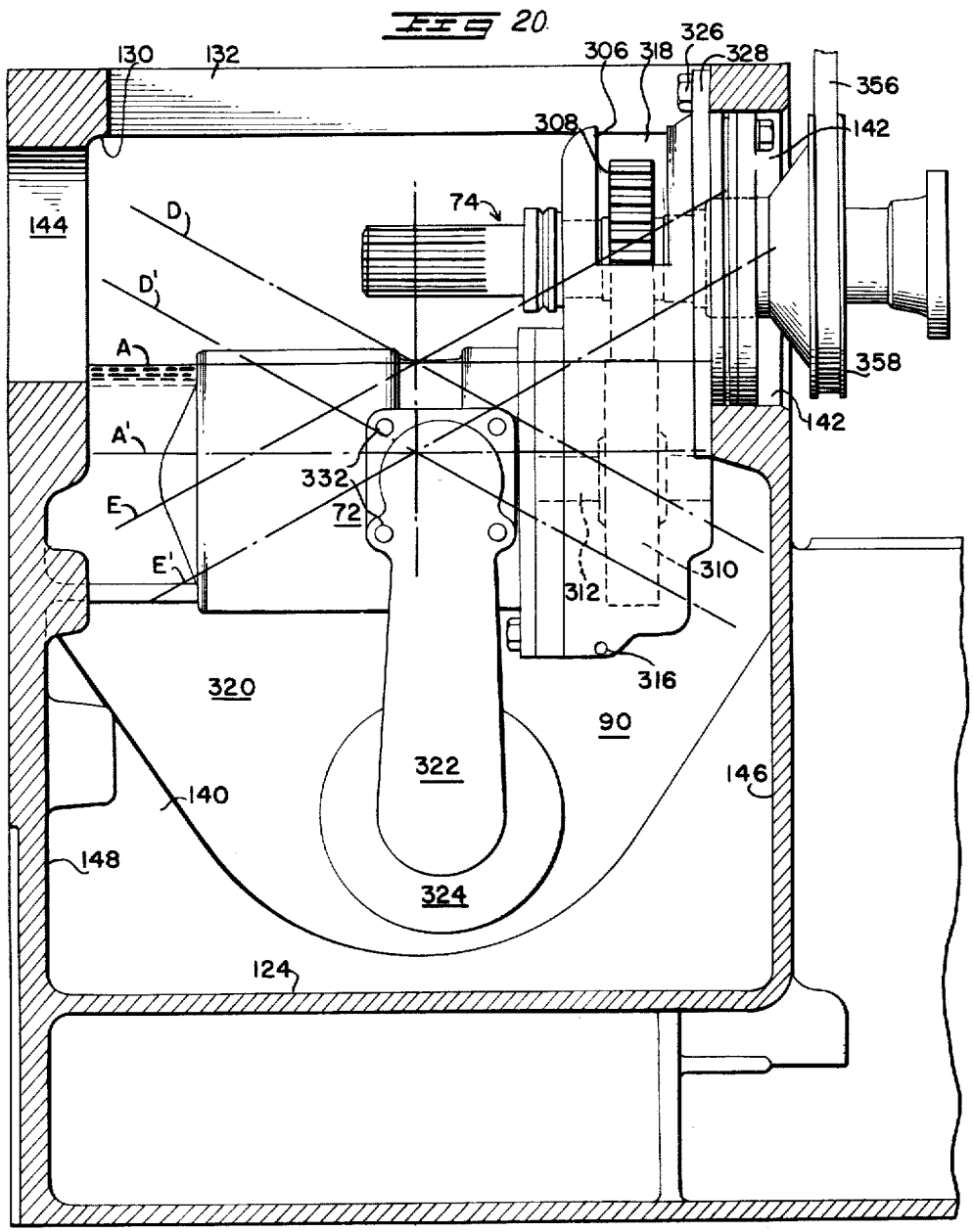
FIG. 20 is a partially cut-away and sectioned side elevation view of the integrally cast hydraulic reservoir with a pump and pump drive means therein.
Figure 21:
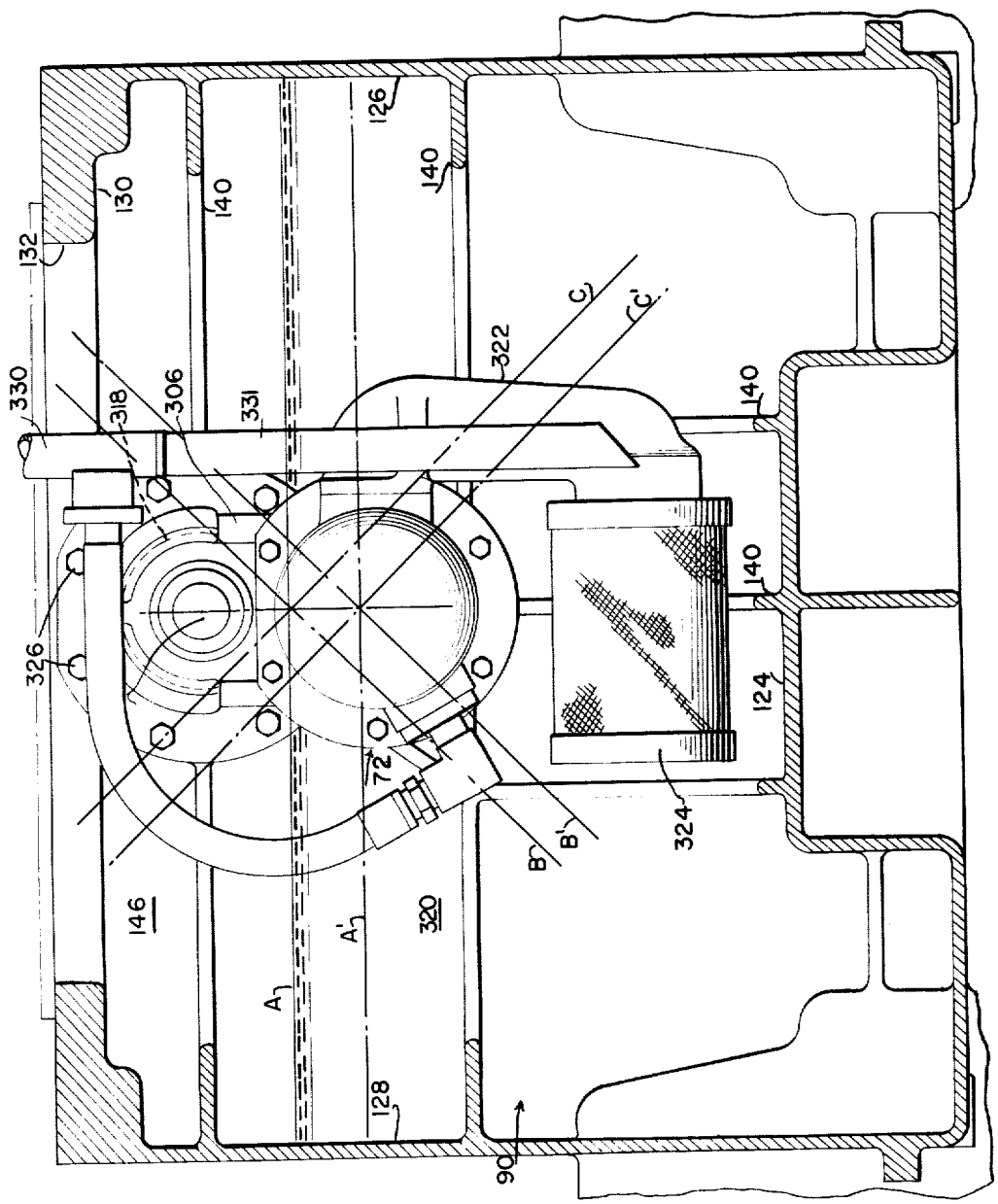
FIG. 21 is a partially cut-away and sectioned end view of the reservoir with the pump and pump drive illustrated in FIG. 20.

Referring particularly to FIGS. 20 and 21, there is shown the improved hydraulic system of the present invention. Referring to these drawings, the rear power output shaft 66 from the prime mover 44 is connected by universal joints 300 to the rear power takeoff shaft 74 which passes through the opening 142 into the hydraulic reservoir 90. The most rearward end of shaft 74 is provided with splines for connection to a rear power takeoff extension as shown in FIG. 22 for the non-pump drive arrangement.

Bearings 302 and 304, FIG. 22, in bearing support structure 306 support shaft 74 on both sides of drive gear 308 for the pump drive. Gear 310 which is below and driven by gear 308 is fixed to input shaft 312 of hydraulic pump means 72. Gear shaft 312 is rotatably supported by suitable bearings (not shown) in bearing support structure 306. Structure 306 comprises an improved housing for the pump gear drive and is provided with small opening means 316, FIG. 20, at the bottom for restricted inflow of oil from the reservoir to the gears and bearings and large openings 318 at the top and above the oil level in order that excess oil will be thrown from the housing structure 306 by the rotating gears. The small opening 316 below the oil level and the large opening 318 above the oil level prevents overheating of the gears working in excess oil in structure 306 and at the same time provides adequate lubrication. If more oil than is necessary enters structure 306, it is promptly thrown out by the gears through the large openings 318 above the level of oil in reservoir 90.

Pump means 72, which is substantially immersed in oil 320 in the reservoir 90 throughout the practical limits of vehicle pitch and side tilt as graphically shown in FIGS. 20 and 21, has a downwardly extending suction line 322 which is connected to a large suction filter 324. Therefore, leaks in the suction system cannot introduce air into the hydraulic system and any leaks from the pressure side of the pump simply returns the oil to the reservoir.

The maximum oil level is indicated in FIGS. 20 and 21 by line A and the minimum oil level for proper functioning of the system is indicated by broken line A'. The maximum and minimum oil levels for 30° slope, forwardly or rearwardly or 45° tilt to either side, are indicated by broken lines D, D', E, E', B, B', and C and C' respectively.

The output conduit 330 from the pump means 72 and the return line 331 are connected to the manifold plate means 134 which is bolted to the top 130 of the reservoir structure 90 over the large opening 132. From the manifold structure 134 the pressure fluid is directed to the distributing valve means 136 illustrated in FIG. 4 of the drawings.

The gear drive for the pump means 72 may be assembled in housing structure 306 and assembled with the pump and bearings on the bench and then inserted through the large inspection opening 132 in the top 130 of reservoir 90. It is then fastened in place by bolts 326 through flange 328 and connected to shaft 66 from the prime mover 44. Pump means 72 may be easily removed from the housing structure 80 and from the reservoir without disturbing any other portion of the drive by removing bolts 326. The large suction filter 324 may be removed separately, for servicing, through inspection opening 132, with the suction line 322 if bolts 332 have been removed or in assembly with the pump means 72 as desired.

Referring also to FIG. 22 when reservoir 90 is not used for hydraulic fluid and there is no pump means 72 nor pump drive required, the bearing support housing 334 is used in place of housing structure 306. Housing 334 is entirely closed and has an additional seal 336 in order to maintain therein a supply of oil for bearings 302 and 304. Splines 338 are for a power takeoff extension 340 which extends through suitable seal and bearing support means (not shown) in opening 144 of reservoir 90 which is otherwise closed by a plate 150 bolted in place.

Cooling System for the Prime Mover

Where the prime mover 44 is of the liquid cooled internal combustion type, a radiator 70 illustrated, for example, in FIG. 2 of the drawings is mounted on a suitable shroud and frame structure 350. The radiator 70 is positioned adjacent the rearward end of the prime mover 44 and the fan structure 68 is rotatably mounted from suitable bearing support means 352. The fan 68 has mounted thereto a sheave 354 which sheave receives a V-belt 356. The belt 356 is driven by a sheave 358 secured to the shaft 74 which is rotated from the rearwardly extending power output shaft 66 of the prime mover 44 through universal connections 300. The fan 68 is of the suction type whereby upon operation of the prime mover, air is moved into the portion of the vehicle housing the prime mover 44, through the radiator 70 from front to rear, thence to the fan blades and out of louvered rear upper deck 360. This arrangement of prime mover radiator and suction type fan substantially reduces abrasive wear to the radiator assembly and prevents blowing of dirt and hot air in the direction of the operator's compartment 76, which as hereinbefore described is mounted forwardly of the prime mover 44. The avoidance of blasting dirt and abrasive particles against the radiator structure, combined with the advantages obtained by directing the dust-laden air away from the operator and from the engine, substantially improves operating conditions and minimizes down-time required for repairs and cleaning of the cooling system and the motor.

Referring to FIG. 19, a modified radiator and fan structure is illustrated. In FIG. 19 the radiator 70' is supported from the main frame 36 by support brackets 400. A pair of suction type fans 68' are rotatably supported by shroud members 402. Each fan 68' is driven by belt means 356' which passes about fan sheaves 354' and sheave 358 secured to the shaft 74. The fans 68' like fan 68 are of the suction type whereby air is moved through the radiator 70' from front to rear as hereinbefore described with reference to fan 68.

From the foregoing description, it will be seen that the improved land vehicle and frame structure therefor fully accomplish the aims and objects hereinbefore set forth and it will be apparent that various changes and modifications may be effected therein without departing from the spirit and the scope of the invention as defined in the appended claims.

We claim:

1. A unitary cast main frame for a land vehicle including a rear transverse member, a front transverse member and spaced side members integrally joining said rear and front transverse members, said rear transverse member having laterally spaced cavities formed therein for the reception of vehicle final drive components and a well extending between said laterally spaced final drive receiving cavities, hydraulic fluid in said well, a pump and drive means therefor received in said well, a hydraulic fluid ingress opening in the lower end of the pump drive means in communication with the hydraulic fluid, a hydraulic fluid egress opening in the upper end of the pump drive means, said front transverse member including a depending boss cooperating with tie means for joining said front member of the main frame and ground-engaging vehicle propelling means, said spaced side members each comprising side web members and stiffening webs integrally formed along the upper and lower edges of said side web members.

2. In a land vehicle having a unitary cast main frame, a well in said cast main frame, hydraulic fluid in said well, a pump and drive means therefor received in said well, an opening in the lower end of the pump drive means below the fluid level for the ingress of hydraulic fluid and a further opening in the upper end of the pump drive means for the egress of hydraulic fluid.

3. The invention defined in claim 2 wherein the further opening is larger than the opening at the lower end of the pump drive means and said further opening is positioned above the normal level of hydraulic fluid in said well.

4. In a land vehicle including a unitary cast main frame having a rear transverse member, a front transverse member and spaced side members integrally joining said rear and front transverse members, said rear transverse member having laterally spaced cavities formed therein for the reception of vehicle final drive components and a well extending between said laterally spaced final drive receiving cavities, said front transverse member including a depending boss cooperating with tie means for joining said front transverse member of the main frame and ground-engaging vehicle propelling means, said spaced side members each comprising side web members and stiffening webs integrally formed along the upper and lower edges of said side web members, a pocket formed in each of said spaced side members with the access to said pockets through said side web members, a transmission mounted to said front transverse member and projecting forwardly thereof, said transmission having a single rearwardly projecting input shaft and a pair of rearwardly projecting power output shafts, a prime mover supported by said spaced side members, said prime mover having a forwardly extending power shaft, means connecting said power shaft to the input shaft of the transmission, shaft means extending rearwardly from each of said pair of rearwardly projecting power output shafts, each of said shaft means extending generally parallel to said side web members and passing through openings in their respective pockets formed in each of said spaced side members, disc brake means for each of the rearwardly extending shaft means maintained in the pockets formed in said spaced side members, removable plate means releasably secured over the access opening to said pockets formed in the side web members, said disc brake means include air impelling vane means associated with said disc brake, and air flow directing conduit means cooperating with said air impelling vane means for drawing air through the pockets formed in each of said spaced side members.

References Cited in the file of this patent

UNITED STATES PATENTS

| | | |
|---|---|---|
| 1,344,209 | Patitz | June 22, 1920 |
| 1,882,319 | Gurney | Oct. 11, 1932 |
| 1,920,883 | Perkins | Aug. 1, 1933 |
| 1,932,108 | Johnston et al. | Oct. 24, 1933 |
| 2,002,474 | Johnston et al. | May 21, 1935 |
| 2,047,336 | Stout | July 14, 1936 |
| 2,095,058 | Cross | Oct. 5, 1937 |
| 2,127,032 | Johnston et al. | Aug. 16, 1938 |
| 2,394,119 | Tomik | Feb. 5, 1946 |
| 2,833,361 | Schwartz | May 6, 1958 |
| 2,843,213 | Schwartz | July 15, 1958 |
| 2,857,009 | Adams et al. | Oct. 21, 1958 |

UNITED STATES PATENT OFFICE
Certificate

Patent No. 3,085,643          Patented April 16, 1963

Daniel M. Schwartz, Theodore N. Hackett, and Joseph Rosenblatt

Application having been made jointly by Daniel M. Schwartz, Theodore N. Hackett and Joseph Rosenblatt, the inventors named in the patent above identified, and The Eimco Corporation, Salt Lake City, Utah, a corporation of Delaware, the assignee, for the issuance of a certificate under the provisions of Title 35, Section 256 of the United States Code, deleting the name of the said Joseph Rosenblatt from the patent as a joint inventor, and a showing and proof of facts satisfying the requirements of the said section having been submitted, it is this 13th day of August 1963, certified that the name of the said Joseph Rosenblatt is hereby deleted from the said patent as a joint inventor with the said Daniel M. Schwartz and Theodore N. Hackett.

[SEAL]

EDWIN L. REYNOLDS,
*First Assistant Commissioner of Patents.*